United States Patent
Liu et al.

(10) Patent No.: US 10,187,370 B2
(45) Date of Patent: *Jan. 22, 2019

(54) FAST-ACCESSING METHOD AND APPARATUS

(71) Applicant: Nokia Technologies Oy, Espoo (FI)

(72) Inventors: Yang Liu, Beijing (CN); Haitao Li, Beijing (CN); Yixue Lei, Beijing (CN); Dajiang Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,499

(22) Filed: Sep. 21, 2017

(65) Prior Publication Data
US 2018/0026958 A1  Jan. 25, 2018

Related U.S. Application Data

(63) Continuation of application No. 14/372,860, filed as application No. PCT/CN2012/070896 on Feb. 6, 2012, now Pat. No. 9,807,072.

(51) Int. Cl.
*G06F 17/30* (2006.01)
*H04L 29/06* (2006.01)
(Continued)

(52) U.S. Cl.
CPC .............. *H04L 63/08* (2013.01); *H04L 63/10* (2013.01); *H04W 12/04* (2013.01);
(Continued)

(58) Field of Classification Search
CPC ......... H04L 63/08; H04L 63/10; H04L 63/20; H04L 63/102; H04L 9/08; G06F 21/6218
See application file for complete search history.

(56) References Cited

U.S. PATENT DOCUMENTS 6,965,992 B1   11/2005  Joseph et al.
7,475,241 B2   1/2009   Patel et al.
(Continued)

FOREIGN PATENT DOCUMENTS

CN    1960569 A      5/2007
CN    101212798 A    7/2008
(Continued)

OTHER PUBLICATIONS

"3GPPTR33821V100" standard, Dec. 2007, available at http://www.3gpp.org/ftp/Specs/archive/33.sub.--series/33.821/33821-100.zi- p.
(Continued)

*Primary Examiner* — Ali S Abyaneh
(74) *Attorney, Agent, or Firm* — Mintz Levin Cohn Ferris Glovsky and Popeo, P.C.

(57) ABSTRACT

A fast-accessing method may comprise: establishing a first security connection between a first network node and a user equipment; obtaining first information from a second network node, wherein the first information comprises at least one of system information of the second network node and an identifier of a security algorithm selected by the second network node for the user equipment; providing second information to the second network node, in response to an indication of the second network node from the user equipment, wherein the second information comprises security information related to the user equipment; and sending the first information to the user equipment for establishing a second security connection between the user equipment and the second network node.

11 Claims, 5 Drawing Sheets

(51) Int. Cl.
*H04W 12/04* (2009.01)
*H04W 48/08* (2009.01)
*H04W 36/00* (2009.01)

(52) U.S. Cl.
CPC ...... *H04L 63/205* (2013.01); *H04L 2463/061* (2013.01); *H04W 36/0038* (2013.01); *H04W 48/08* (2013.01)

(56) References Cited

U.S. PATENT DOCUMENTS

| | | | |
|---|---|---|---|
| 7,551,576 | B2 | 6/2009 | Ahmavaara |
| 7,606,194 | B2 | 10/2009 | He |
| 7,983,656 | B2 | 7/2011 | Nguyen et al. |
| 8,019,346 | B2 | 9/2011 | Sachs et al. |
| 2004/0014422 | A1 | 1/2004 | Kallio |
| 2005/0254469 | A1 | 11/2005 | Verma et al. |
| 2007/0147315 | A1 | 6/2007 | Khoury et al. |
| 2007/0230453 | A1* | 10/2007 | Giaretta .......... H04L 63/08 370/389 |
| 2009/0209259 | A1 | 8/2009 | Brusilovsky et al. |
| 2009/0247176 | A1 | 10/2009 | Song et al. |
| 2010/0067697 | A1 | 3/2010 | Casati et al. |
| 2010/0166179 | A1 | 7/2010 | Gundavelli et al. |
| 2010/0263021 | A1 | 10/2010 | Arnott et al. |
| 2011/0040888 | A1* | 2/2011 | Krishnaswamy ... H04L 63/0884 709/231 |
| 2011/0185397 | A1 | 7/2011 | Escott et al. |
| 2011/0201337 | A1 | 8/2011 | Forsberg et al. |
| 2011/0305339 | A1 | 12/2011 | Norrman et al. |
| 2012/0028631 | A1 | 2/2012 | Chun et al. |

FOREIGN PATENT DOCUMENTS

| | | | |
|---|---|---|---|
| CN | 101998388 A | 3/2011 | |
| EP | 2109278 A1 * | 10/2009 | ........... H04L 63/062 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release11)", 3GPP TS 36.300, V11.0.0, Dec. 2011, pp. 1-194.

"3rd Generation Partnership Project; Technical Specification Group Services and System Aspects; 3GPP System Architecture Evolution (SAE); Security Architecture (Release 11)", 3GPP TS 33.401, v11.1.0, Sep. 2011, pp. 1-124.

"eNode B Wraparound Testing a Comprehensive Guide", IXIA, Rev B, Aug. 2009, pp. 1-22.

"Long Term Evolution Protocol Overview", White Paper, Freescale Semiconductor, Rev 0, Oct. 2008, 21 pages.

"LTE Frequently Asked Questions", LTE World, Retrieved on Aug. 11, 2014, Webpage available at : http://lteworld.org/faq.

Extended European Search Report received for corresponding European Patent Application No. 12867929.7, dated Aug. 21, 2015, 9 pages.

International Search Report received for corresponding Patent Cooperation Treaty Application No. PCT/CN2012/070896, dated Nov. 15, 2012, 3 pages.

* cited by examiner

FAST-ACCESSING METHOD AND APPARATUS

CROSS REFERENCE TO RELATED APPLICATIONS

This Application is a Continuation of application Ser. No. 14/372,860 filed on Jul. 17, 2014, which claims priority benefit to PCT/CN2012/070896 filed Feb. 6, 2012. The entire contents of these applications are incorporated herein by reference in their entirety.

FIELD OF THE INVENTION

The present invention generally relates to communication networks. More specifically, the invention relates to a fast-accessing method and apparatus.

BACKGROUND

The modern communications era has brought about a tremendous expansion of communication networks. Wireless and mobile networking technologies have addressed related consumer demands, while providing more flexibility and immediacy of information transfer. In a communication system such as Long Term Evolution (LTE) network, before a user equipment (UE) initiates transmission of Radio Resource Control (RRC) messages and Non-Access Stratum (NAS) messages, Security Mode Command (SMC) procedures for Access Stratum (AS) and NAS need to be activated separately. The security procedures and system information acquisitions are time-consuming, which introduce much time-delay when users access to a communication network. A solution to accelerate the access procedure for users in a communication network may be desired.

SUMMARY

The present description introduces a solution for fast accessing a communication network, which can speed up the access procedure for users and bring good user experiences when enjoying communication services.

According to a first aspect of the present invention, there is provided a method comprising: establishing a first security connection between a first network node and a UE; obtaining first information from a second network node, wherein the first information comprises at least one of system information of the second network node and an identifier of a security algorithm selected by the second network node for the UE; providing second information to the second network node, in response to an indication of the second network node from the UE, wherein the second information comprises security information related to the UE; and sending the first information to the UE for establishing a second security connection between the UE and the second network node.

According to a second aspect of the present invention, there is provided an apparatus comprising: at least one processor; and at least one memory including computer program code, the at least one memory and the computer program code configured to, with the at least one processor, cause the apparatus to perform at least the following: establishing a first security connection between the apparatus and a UE; obtaining first information from another apparatus, wherein the first information comprises at least one of system information of the another apparatus and an identifier of a security algorithm selected by the another apparatus for the UE; providing second information to the another apparatus, in response to an indication of the another apparatus from the UE, wherein the second information comprises security information related to the UE; and sending the first information to the UE for establishing a second security connection between the UE and the another apparatus.

According to a third aspect of the present invention, there is provided a computer program product comprising a computer-readable medium bearing computer program code embodied therein for use with a computer, the computer program code comprising: code for establishing a first security connection between a first network node and a UE; code for obtaining first information from a second network node, wherein the first information comprises at least one of system information of the second network node and an identifier of a security algorithm selected by the second network node for the UE; code for providing second information to the second network node, in response to an indication of the second network node from the UE, wherein the second information comprises security information related to the UE; and code for sending the first information to the UE for establishing a second security connection between the UE and the second network node.

According to a fourth aspect of the present invention, there is provided an apparatus comprising: establishing means for establishing a first security connection between the apparatus and a UE; obtaining means for obtaining first information from another apparatus, wherein the first information comprises at least one of system information of the another apparatus and an identifier of a security algorithm selected by the another apparatus for the UE; providing means for providing second information to the another apparatus, in response to an indication of the another apparatus from the UE, wherein the second information comprises security information related to the UE; and sending means for sending the first information to the UE for establishing a second security connection between the UE and the another apparatus.

According to exemplary embodiments, the apparatus in the second/fourth aspect of the present invention may comprise a first network node, and the another apparatus in the second/fourth aspect of the present invention may comprise a second network node. In an exemplary embodiment, establishing the first security connection between the first network node and the UE may comprise obtaining a first security key for the first security connection, and wherein the security information related to the UE may comprise: an identifier of the UE, and a second security key generated based at least in part on the first security key. For example, the first information may be obtained through a direct interface or an indirect interface between the first network node and the second network node. According to exemplary embodiments, the first security connection is still maintained when the second security connection is established.

According to a fifth aspect of the present invention, there is provided a method comprising: establishing a first security connection between a first network node and a UE; sending an indication of a second network node to the first network node; and receiving first information from the first network node for establishing a second security connection between the UE and the second network node, wherein the first information comprises at least one of system information of the second network node and an identifier of a security algorithm selected by the second network node for the UE.

According to a sixth aspect of the present invention, there is provided an apparatus comprising: at least one processor;

and at least one memory including computer program code, the at least one memory and the computer program code configured to, with the at least one processor, cause the apparatus to perform at least the following: establishing a first security connection between a first network node and the apparatus; sending an indication of a second network node to the first network node; and receiving first information from the first network node for establishing a second security connection between the apparatus and the second network node, wherein the first information comprises at least one of system information of the second network node and an identifier of a security algorithm selected by the second network node for the apparatus.

According to a seventh aspect of the present invention, there is provided a computer program product comprising a computer-readable medium bearing computer program code embodied therein for use with a computer, the computer program code comprising: code for establishing a first security connection between a first network node and a UE; code for sending an indication of a second network node to the first network node; and code for receiving first information from the first network node for establishing a second security connection between the UE and the second network node, wherein the first information comprises at least one of system information of the second network node and an identifier of a security algorithm selected by the second network node for the UE.

According to an eighth aspect of the present invention, there is provided an apparatus comprising: establishing means for establishing a first security connection between a first network node and the apparatus; sending means for sending an indication of a second network node to the first network node; and receiving means for receiving first information from the first network node for establishing a second security connection between the apparatus and the second network node, wherein the first information comprises at least one of system information of the second network node and an identifier of a security algorithm selected by the second network node for the apparatus.

According to exemplary embodiments, the apparatus in the sixth/eighth aspect of the present invention may comprise a UE. In accordance with an exemplary embodiment, establishing the second security connection between the UE and the second network node may comprise: performing an authentication procedure based at least in part on the first information and second information comprising security information related to the UE. In accordance with another exemplary embodiment, establishing the first security connection between the first network node and the UE may comprise obtaining a first security key for the first security connection, and wherein the security information related to the UE may comprise: an identifier of the UE, and a second security key generated based at least in part on the first security key.

According to a ninth aspect of the present invention, there is provided a method comprising: reporting first information to a first network node, wherein the first information comprises at least one of system information of a second network node and an identifier of a security algorithm selected by the second network node for a UE having a first security connection with the first network node; and receiving second information from the first network node for establishing a second security connection between the second network node and the UE, wherein the second information comprises security information related to the UE.

According to a tenth aspect of the present invention, there is provided an apparatus comprising: at least one processor; and at least one memory including computer program code, the at least one memory and the computer program code configured to, with the at least one processor, cause the apparatus to perform at least the following: reporting first information to another apparatus, wherein the first information comprises at least one of system information of the apparatus and an identifier of a security algorithm selected by the apparatus for a UE having a first security connection with the another apparatus; and receiving second information from the another apparatus for establishing a second security connection between the apparatus and the UE, wherein the second information comprises security information related to the UE.

According to a eleventh aspect of the present invention, there is provided a computer program product comprising a computer-readable medium bearing computer program code embodied therein for use with a computer, the computer program code comprising: code for reporting first information to a first network node, wherein the first information comprises at least one of system information of a second network node and an identifier of a security algorithm selected by the second network node for a UE having a first security connection with the first network node; and code for receiving second information from the first network node for establishing a second security connection between the second network node and the UE, wherein the second information comprises security information related to the UE.

According to a twelfth aspect of the present invention, there is provided an apparatus comprising: reporting means for reporting first information to another apparatus, wherein the first information comprises at least one of system information of the apparatus and an identifier of a security algorithm selected by the apparatus for a UE having a first security connection with the another apparatus; and receiving means for receiving second information from the another apparatus for establishing a second security connection between the apparatus and the UE, wherein the second information comprises security information related to the UE.

According to exemplary embodiments, the apparatus in the tenth/twelfth aspect of the present invention may comprise a second network node, and the another apparatus in the tenth/twelfth aspect of the present invention may comprise a first network node. In accordance with exemplary embodiments, the security information related to the UE may comprise: an identifier of the UE, and a second security key generated based at least in part on a first security key for the first security connection. In an exemplary embodiment, establishing the second security connection between the second network node and the UE may comprise: performing an authentication procedure based at least in part on the first information and the second information.

In exemplary embodiments of the present invention, the provided methods, apparatus, and computer program products can decrease time-delay during an access procedure to a communications network, and speed up access progress for a UE to obtain services supported by the communications network.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Along with the development of radio communication networks such as LTE system, high-speed data services have been treated as one of the most important requirements. Especially for a Local Area Network (LAN), higher data rate is expected from a user's perspective. How to provide local services with high speed data rate has become a hot topic in 3GPP (3rd Generation Partnership Project).

A new architecture called as Local Area Evolution (LAE) is designed aiming to deploy a local area system providing high performance on peak data rate, cell capacity, Quality of Service (QoS) guarantee, interference management, etc. In LAE system, Support Node (SN) concept is introduced and it is a network element located in the core network, providing some support/control/maintenance functionalities to the LAE system. A Base Station (BS) is located in the Radio Access Network (RAN) side which provides a local area network, just like Home evolved Node B (HeNB) in LTE system. A UE may maintain two connections, one with a macro eNB (macro connection) and another with a LAE BS (LAE connection), which is called "dual radio connections". The macro network connection is more stable and more carefully managed so that the UE could not easily lose its connection, while the LAE connection is there more for providing high speed data services and some characteristic services in a local area. Another architecture called as LTE-LAN is also researched to compete with world-wide popular Wireless Fidelity (WiFi) technique. LTE-LAN is basically assumed to be based on LTE technology but is more focused on some local area use cases and scenarios, and it has much similarity with LAE concept. LTE-LAN is also expected to provide high performance local services for users with low cost. A BS in LAE architecture may be considered as an AP in LTE-LAN system. LTE-LAN and LTE macro network are independent networks which may operate in different bands. So far, an X2-like or S1-like interface may be introduced between different APs and between an AP and an eNB, since a lot of features (for example carrier aggregation, interference management, etc.) would be developed with this interface.

Figure 1:
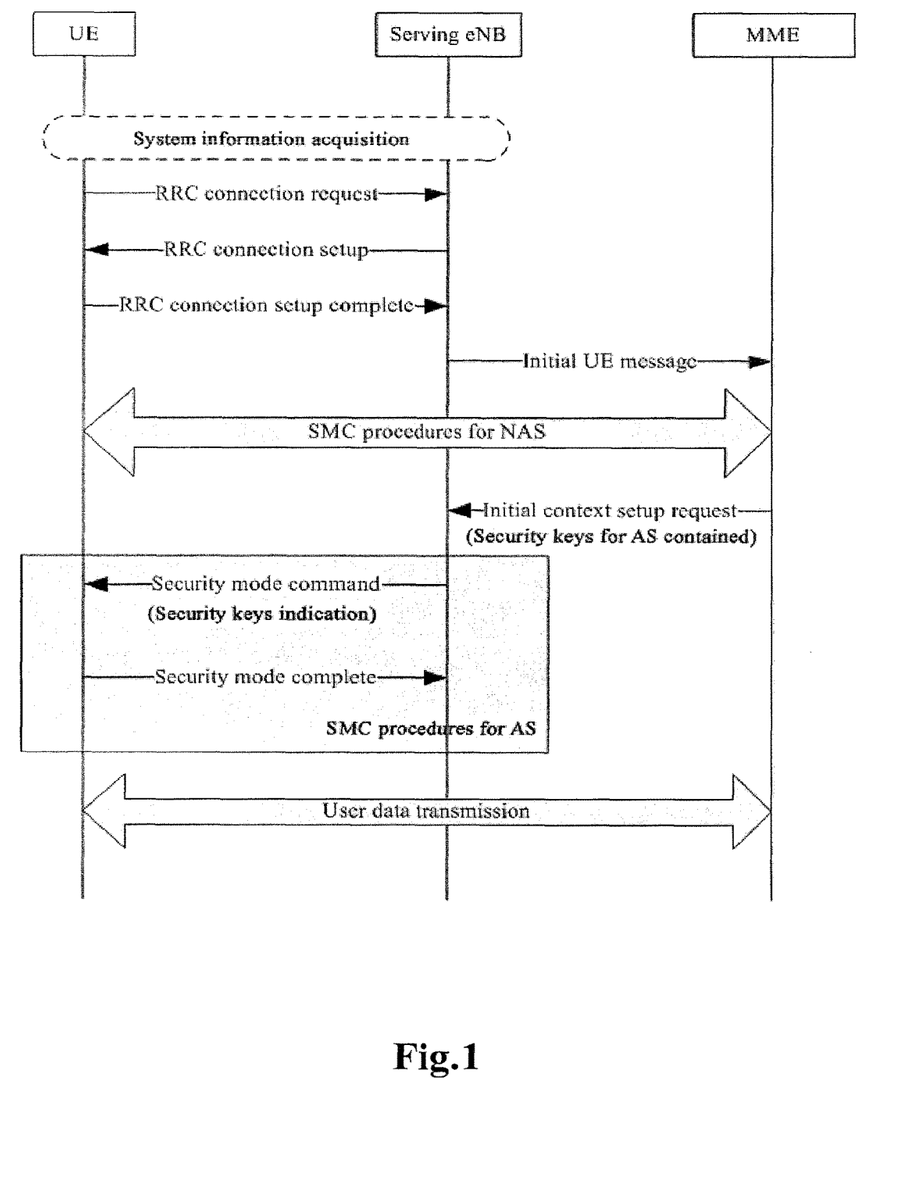
FIG. 1 exemplarily shows a service request procedure for a UE considering security issues.

In a LTE system, for example, system acquisition procedures and authentication procedures for AS are performed to support a RRC connection between a UE and a network node such as a serving eNB. FIG. 1 exemplarily shows a service request procedure for a UE considering security issues. When the UE is trying to establish a RRC connection with the serving eNB, the UE needs to read system information from the serving eNB. In addition, before the UE initiates transmission of RRC messages and NAS messages, it is needed to activate SMC procedures for AS and NAS separately. Specifically, after the RRC connection is established, as shown in FIG. 1, a SMC procedure for AS is performed to obtain security keys for AS from the core network such as a Mobility Management Entity (MME). Generally, during the RRC connection establishment procedure, the same key for Access Security Management Entity ($K_{ASME}$) is shared between the UE and the MME, which may be used to provide keys for NAS layer security and AS layer security. As illustrated in FIG. 1, the security procedures and system information acquisitions are time-consuming, which introduce much time-delay when users access to the network.

In a communication system such as LTE-LAN and LAE network, as described above, a UE may maintain two connections, one for a macro network and another for a local area network, which is called "dual radio connections". For example, the UE may have two independent RRC connections, one with its serving eNB and the other with its serving AP. When the UE has established a first RRC connection with a first network (such as a macro network) and is trying to establish a second RRC connection with a second network (such as a local area network), the UE may have to read system information from the second network first since the UE only has system information obtained from the first network during establishment of the first RRC connection. After the second RRC connection is established, according to the specifications for LTE (for example 3GPP TS 33.401), a SMC procedure for AS is needed to ensure security, which is time-consuming and introduces time-delay during access procedures for users. Thus, it is desirable to provide a novel solution to accelerate access procedures for users, for example in a second serving network such as a local area network, and bring good user experiences when enjoying local services.

Figure 2:
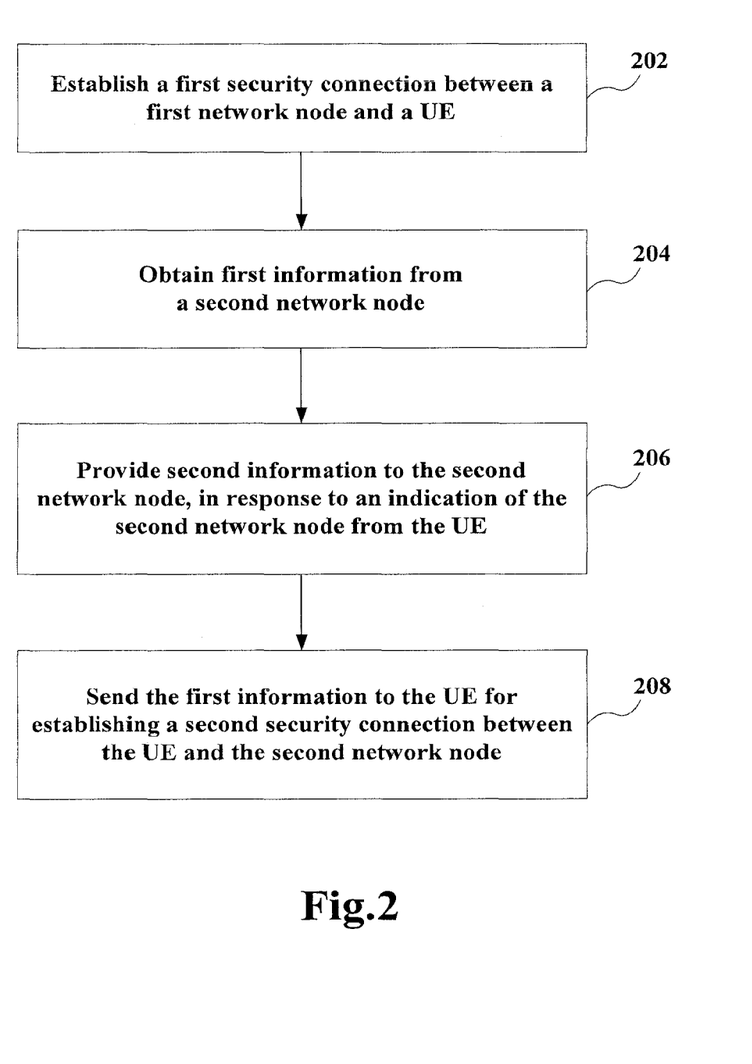
FIG. 2 is a flowchart illustrating a fast-accessing method, which may be performed at a first network node in accordance with embodiments of the present invention.

FIG. 2 is a flowchart illustrating a fast-accessing method, which may be performed at a first network node (such as a BS/eNB/AP/control center, etc.) in accordance with embodiments of the present invention. The solution according to exemplary embodiments may be applicable to a communication network such as LTE-LAN and LAE where a UE (such as a mobile station, a wireless terminal, a personal digital assistant (PDA), a portable device and the like) may establish respective radio connections with two network nodes. In block 202, a first security connection may be established between the first network node and the UE. Then the first network node may obtain first information from a second network node, as shown in block 204. According to an exemplary embodiment, the first network node may obtain respective first information from one or more neighboring network nodes comprising the second network node. For example, the first information may comprise at least one of: system information of the second network node, and an identifier (ID) of a security algorithm selected by the second network node for the UE. In an exemplary embodiment, the first information may be obtained through an interface between the first network node and the second network node. The interface may comprise a direct interface (such as a X2-like interface, or a S1-like interface defined for direct data transmissions) through which the first information may be transferred to the first network node from the second network node directly, or an indirect interface (such as a S1-like interface) through which the first information from the second network node may be transferred to the first network node via a network entity (such as a MME) or other suitable intermediate entity in core networks. In response to an indication of the second network node from the UE, the first network node may provide second information to the second network node, as shown in block 206. For example, the first network node may use a signaling message (for example any X2-AP messages such as eNB configuration update procedure) or a dedicated procedure to communicate the second information to the second network node. In an exemplary embodiment, the second information may comprise security information related to the UE, which can be used by the second network node in establishing a second security connection with the UE. In block 208, the first network node may send the first information to the UE for establishing a second security connection between the UE and the second network node. For example, the first network node may use a signaling message such as downlink (DL) information transfer or any newly defined signaling messages to transmit the first information to the UE. In an exemplary embodiment, establishing the first security connection between the first network node and the UE may comprise obtaining a first security key (such as $K_{eNB}$) for the first security connection. In this case, the security information related to the UE may comprise an identifier of the UE (such as System Architecture Evolution Temporary Mobile Station Identifier (S-TMSI)), and a second security key generated based at least in part on the first security key (such as $K_{eNB}^*$ calculated with $K_{eNB}$, Physical Cell Identity (PCI) and frequency of the second network node, for example according to TS 33.401). According to exemplary embodiments, the first security connection is still maintained when the second security connection is established.

Figure 3:
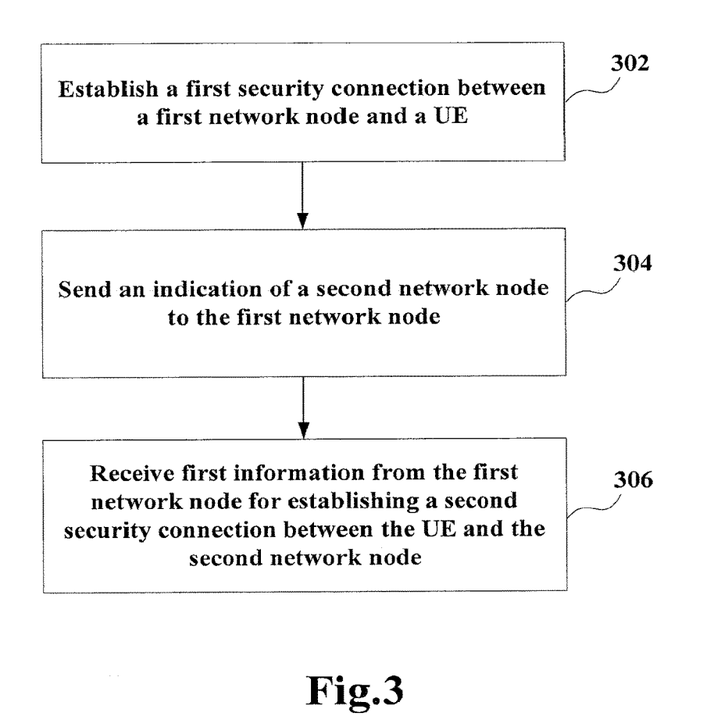
FIG. 3 is a flowchart illustrating a fast-accessing method, which may be performed at a UE in accordance with embodiments of the present invention.

FIG. 3 is a flowchart illustrating a fast-accessing method, which may be performed at a UE in accordance with embodiments of the present invention. Corresponding to the description with respect to FIG. 2, the UE (such as a mobile station, a wireless terminal, a PDA, a portable device and the like) may establish a first security connection with a first network node (such as a BS/eNB/AP/control center, etc.), as shown in block 302. According to exemplary embodiments, since the UE can maintain two independent RRC connections for different services (for example, one with its serving eNB and the other with its serving AP), a user of the UE may want to establish a second security connection with a second network node, in addition to the first security connection. The first network node and the second network node may be the same kind of network nodes or different types of network nodes. For example, one of these two connections may be used for local network services (such as high speed data services in a local area), and the other may be used for macro network services (such as more stable and more carefully managed services in a macro network). In block 304, the UE may send an indication of the second network node to the first network node. For example, the UE may indicate the second network node to the first network node by the first security connection using a signaling message such as uplink (UL) information transfer or any newly defined signaling messages. Then, the UE may receive first information from the first network node for establishing a second security connection with the second network node, as shown in block 306. It is noted that the first security connection is still maintained when the second security connection is established. In an exemplary embodiment, the first information may comprise at least one of the following: an identifier of a security algorithm selected by the second network node for the UE, and system information of the second network node. As such, the UE can initiate establishment of the second security connection with the second network node directly based on the received first information, without triggering a security activation procedure such as Authentication and Key Agreement (AKA) or AS SMC procedure. For example, the UE may perform an authentication procedure with the second network node based at least in part on the first information and second information comprising security information related to the UE. In an exemplary embodiment, the security information related to the UE may comprise an identifier of the UE, and a second security key (such as $K_{eNB}^*$) generated based at least in part on a first security key (such as $K_{eNB}$) which is obtained during establishment of the first security connection with the first network node. For example, the UE may indicate its identifier during a connection setup procedure to the second network node, so that the second network node can map this identifier to a corresponding security key and perform a proper security algorithm selected for the UE. According to an exemplary embodiment, the UE can use $K_{eNB}^*$ (which may be calculated with $K_{eNB}$, PCI and frequency of the second network node according to TS 33.401) to derive keys for integrity (such as $K_{RRCint}$) and keys for encryption (such as $K_{RRCenc}$ and $K_{UPenc}$), for example according to TS 33.401. Besides the time-reduction of AS security procedures, transmitting system information of the second network node from the first network node to the UE can save time of reading the system information from the second network node by the UE, which can also shorten access delay greatly.

Figure 4:
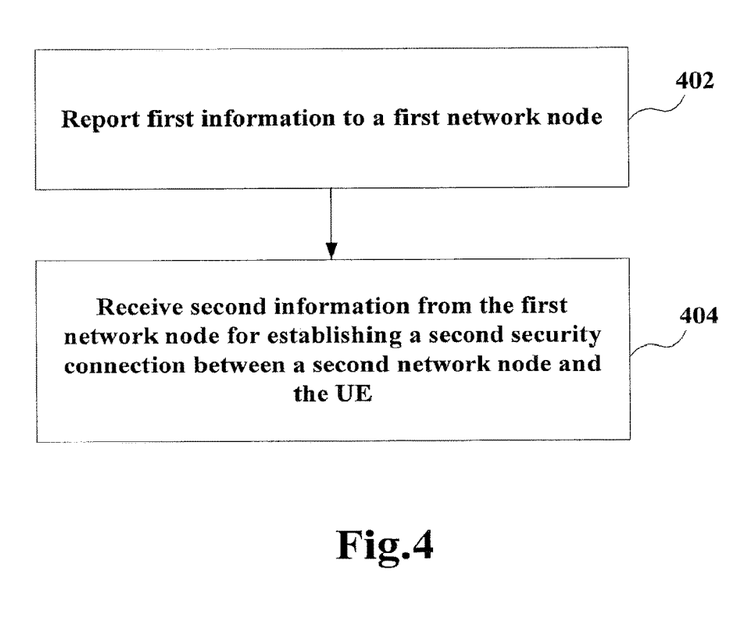
FIG. 4 is a flowchart illustrating a fast-accessing method, which may be performed at a second network node in accordance with embodiments of the present invention.

FIG. 4 is a flowchart illustrating a fast-accessing method, which may be performed at a second network node (such as a BS/eNB/AP/control center, etc.) in accordance with embodiments of the present invention. Corresponding to the description with respect to FIG. 2, the second network node may report first information to a first network node, as shown in block 402. For example, the second network node may use a signaling message (for example any X2-AP messages such as eNB configuration update procedure) or a dedicated procedure to report the first information, which may be provided to a UE by the first network node, in response to an indication from the UE. The first information may comprise at least one of the following: system information of the second network node, and an identifier of a security algorithm selected by the second network node for a UE having a first security connection with the first network node. In an exemplary embodiment, the first network node may require the second network node to report identifiers of the preferred security algorithms (such as RRC integrity/ encryption algorithm ID, UP encryption algorithm ID, etc.) by sending the related UE capability to the second network node for algorithm selection. In block 404, the second network node may receive second information from the first network node for establishing a second security connection with the UE. For example, an authentication procedure may be performed between the UE and the second network node based at least in part on the first information and the second information. According to an exemplary embodiment, the second information may comprise security information related to the UE, such as an identifier of the UE and a second security key generated based at least in part on a first security key for the first security connection. Based on the identifier of the UE, the second network node can map the corresponding second security key to this UE. According to an exemplary embodiment, the second network node may maintain a binding relationship between the UE and previously received security keys from the first network nodes, for example, based on S-TMSI. Thus it can be seen that with this method, there is no need to trigger an additional security activation procedure such as AKA or AS SMC procedure to obtain a security key for the authentication between the second network node and the UE. The time-delay during an access procedure between the UE and the second network node can be decreased while the access progress for the UE to obtain services supported by the second network node can be speeded up.

The various blocks shown in FIGS. 2-4 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown. In an exemplary implement, given that a UE has already established a first RRC connection with a serving eNB, and that a SMC procedure for AS is also finished, the serving eNB of the UE can use $K_{eNB}$ to derive the $K_{RRCint}$ and $K_{RRCenc}$ for integrity protection and ciphering on Uu interface with the UE. Before the UE establishes a second RRC connection with a serving AP, the serving eNB transfers $K_{eNB}*$ to the serving AP in advance. When the UE initiates a RRC connection setup procedure with the serving AP, the UE can use the same key ($K_{eNB}*$) to derive security keys for integrity check and encryption for RRC messages. Thus no additional AKA or AS SMC are needed. Besides, the serving eNB can also send system information of the serving AP to the UE, which enables the UE to save time for system information acquisition. This solution can help a UE which has an ongoing communication connection with a network realize that it can fast access to another network with much less delay and good user experiences.

Figure 5:
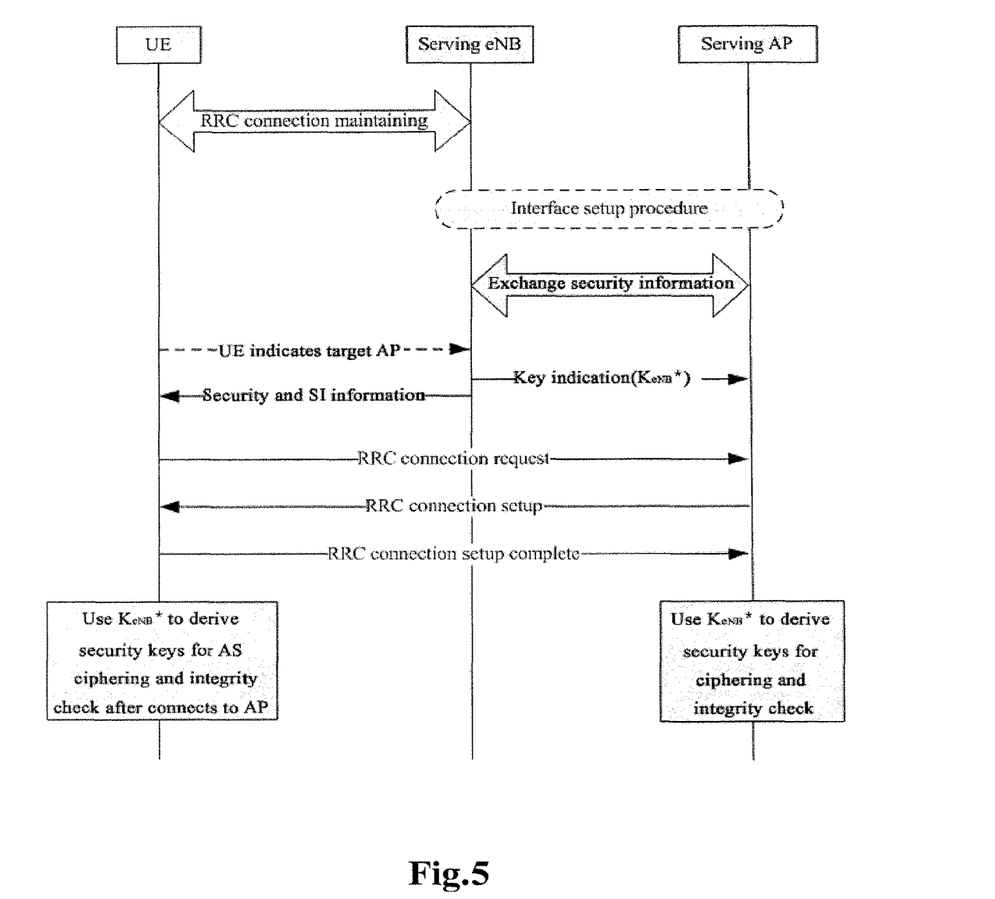
FIG. 5 shows exemplary security procedures when a UE accesses to an Access Point (AP) in accordance with an embodiment of the present invention.

FIG. 5 shows exemplary security procedures when a UE accesses to an AP in accordance with an embodiment of the present invention. In the implementation illustrated in FIG. 5, a UE may maintain two co-existing RRC connections with a communication system, one with a macro eNB (shown as the serving eNB in FIG. 5) and the other with a local AP such as LTE-LAN AP (shown as the serving AP in FIG. 5). According to the exemplary implementation in FIG. 5, the UE has already established a RRC connection with the macro eNB and AS SMC has been completed based at least in part on a first security key (such as $K_{eNB}$), for example.

The serving eNB may begin to setup interfaces (for example direct or indirect interfaces) with one or more neighboring APs which comprise the serving AP shown in FIG. 5. In an exemplary embodiment, one or more neighboring APs comprising the serving AP may report some essential information (for example system information, which may be used by the UE to initiate a RRC connection setup procedure towards the serving AP directly) to the serving eNB, with any X2-AP messages such as the eNB configuration update procedure. Alternatively or additionally, the serving eNB may also require the serving AP to report some security information such as preferred algorithms ID (for example, RRC integrity/encryption algorithm ID, UP encryption algorithm ID, etc) by sending the related UE capability to the AP for algorithm selection, using for example X2-AP messages such as the eNB configuration update procedure or a dedicated procedure. When the UE decides to access to the serving AP for local services, the UE can indicate the serving AP as a target AP to the serving eNB through the existing RRC connection, using a RRC message such as UL information transfer or any new uplink RRC messages. Then the serving eNB may send the target AP's system information and/or algorithm ID selected by the target AP to the UE, using any downlink RRC message such as DL information transfer or any new downlink RRC messages. According to an exemplary embodiment, the algorithm selection for the UE may be done by the serving AP in advance, for example during exchange of security information between the serving eNB and the serving AP. On the other hand, the serving eNB of the UE may send a second security key (such as $K_{eNB}*$, which may be calculated with $K_{eNB}$, PCI and frequency of the serving AP) together with UE ID (for example S-TMSI) to the serving AP, using X2-AP messages such as the eNB configuration update procedure or a dedicated procedure. The serving AP can store the second security key to derive other security keys for further integrity check and ciphering procedures, for example.

According to an exemplary embodiment, as the system information of the serving AP has been provided by the serving eNB, the UE does not have to read the system information of the serving AP. Rather, the UE can initiate a RRC connection setup procedure towards the serving AP directly according to the received system information. Alternatively or additionally, in the RRC connection setup procedure (for example in a RRC connection request towards the serving AP), the UE may indicate the same UE ID (for example S-TMSI) as that sent by the serving eNB to the serving AP. In an exemplary embodiment, this UE ID can be used by the serving AP to map a corresponding second security key to the related UE. After the RRC setup procedure and NAS SMC are finished, as shown in FIG. 5, there is no need to trigger an additional AKA or AS SMC procedure to negotiate the second security key (such as $K_{eNB}*$) between the UE and the serving AP. The UE can directly activate AS security and transmit user data in the air to save time. For example, the UE can derive $K_{RRCint}$, $K_{RRCenc}$ and $K_{UPenc}$ from $K_{eNB}*$ (which is also calculated with $K_{eNB}$, PCI and frequency of the serving AP), for example according to TS 33.401. When the UE is detached from the serving AP, both the UE and the serving AP may delete $K_{RRCint}$, $K_{RRCenc}$ and $K_{UPenc}$ for this connection.

It will be realized by those skilled in the art that the fast-accessing solution provided in the present invention also can be used when a UE (which has established a first connection with a local area network) needs to establish a second connection with a macro network. In this case, before the UE establishes the second connection with an eNB in the macro network, its serving AP may transfer a security key for the second connection to the eNB in advance. When initiating a connection setup procedure with the eNB, the UE can directly use the same security key to derive keys for an authentication procedure with the eNB, and no additional security activation procedure such as AKA or AS SMC is needed. Besides, the serving AP can also send system information of the eNB to the UE, which makes the UE save time for system information acquisition. Many advantages may be achieved by using the above solutions described with respect to FIGS. 2-5. For example, since there is no need to read system information from a target network and negotiate AS security keys, time delay for a UE to establish services with the network can be sharply decreased, and good user performances can be provided with least impact on current specifications.

Figure 6:
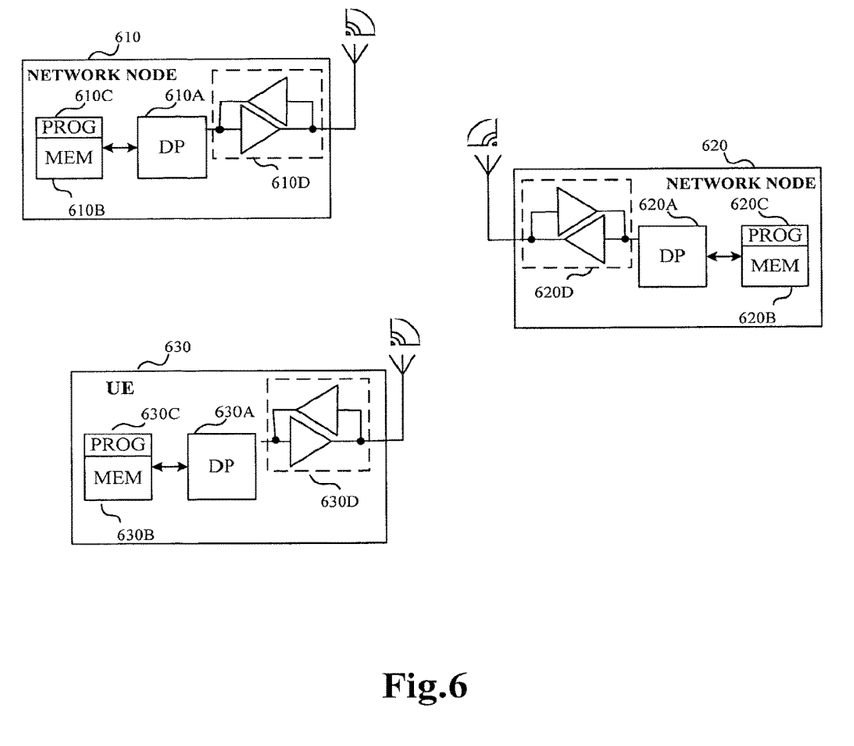
FIG. 6 is a simplified block diagram of various apparatuses which are suitable for use in practicing exemplary embodiments of the present invention.

FIG. 6 is a simplified block diagram of various apparatuses which are suitable for use in practicing exemplary embodiments of the present invention. In FIG. 6, a UE 630 (such as mobile phone, wireless terminal, portable device, PDA, multimedia tablet, and etc.) may be adapted for communicating with one or more network nodes such as a first network node 610 and a second network node 620. The first network node 610 (such as a BS/eNB/AP/control center, etc.) and the second network node 620 (such as a BS/eNB/AP/control center, etc.) may be adapted for communicating with each other directly or through a network entity such as a MME or other intermediate entity in a core network (not shown in FIG. 6). In an exemplary embodiment, the UE 630 may comprise a data processor (DP) 630A, a memory (MEM) 630D that stores a program (PROG) 630C, and a suitable transceiver 630D for communicating with an apparatus such as another UE, a network node, a server and so on. The first network node 610 may comprise a data processor (DP) 610A, a memory (MEM) 610B that stores a program (PROG) 610C, and a suitable transceiver 610D for communicating with an apparatus such as the second network node 620, a UE 630 or a network entity (not shown in FIG. 6). Similarly, the second network node 620 may comprise a data processor (DP) 620A, a memory (MEM) 620B that stores a program (PROG) 620C, and a suitable transceiver 620D for communicating with an apparatus such as the first network node 610, the UE 630 or a network entity (not shown in FIG. 6). For example, at least one of the transceivers 610D, 620D, 630D may be an integrated component for transmitting and/or receiving signals and messages. Alternatively, at least one of the transceivers 610D, 620D, 630D may comprise separate components to support transmitting and receiving signals/messages, respectively. The respective DPs 610A, 620A and 630A may be used for processing these signals and messages.

Alternatively or additionally, the UE 630, the first network node 610 and the second network node 620 may comprise various means and/or components for implementing functions of the foregoing steps and methods in FIGS. 2-4. For example, the UE 630 may comprise: establishing means for establishing a first security connection between a first network node (such as the first network node 610) and the UE; sending means for sending an indication of a second network node (such as the second network node 620) to the first network node; and receiving means for receiving first information from the first network node for establishing a second security connection between the UE and the second network node, wherein the first information may comprise at least one of: system information of the second network node, and an identifier of a security algorithm selected by the second network node for the UE. In an exemplary embodiment, the first network node 610 may comprise: establishing means for establishing a first security connection between the first network node and a UE (such as the UE 630); obtaining means for obtaining first information from a second network node (such as the second network node 620), wherein the first information may comprise at least one of: system information of the second network node, and an identifier of a security algorithm selected by the second network node for the UE; providing means for providing second information to the second network node, in response to an indication of the second network node from the UE, wherein the second information may comprise security information related to the UE; and sending means for sending the first information to the UE for establishing a second security connection between the UE and the second network node. In another exemplary embodiment, the second network node 620 may comprise: reporting means for reporting first information to a first network node (such as the first network node 610), wherein the first information may comprise at least one of: system information of the second network node, and an identifier of a security algorithm selected by the second network node for a UE (such as the UE 630) having a first security connection with the first network node; and receiving means for receiving second information from the first network node for establishing a second security connection between the second network node and the UE, wherein the second information may comprise security information related to the UE.

At least one of the PROGs 610C, 620C, 630C is assumed to comprise program instructions that, when executed by the associated DP, enable an apparatus to operate in accordance with the exemplary embodiments, as discussed above. That is, the exemplary embodiments of the present invention may be implemented at least in part by computer software executable by the DP 610A of the first network node 610, by the DP 620A of the second network node 620 and by the DP 630A of the UE 630, or by hardware, or by a combination of software and hardware.

The MEMs 610B, 620B and 630B may be of any type suitable to the local technical environment and may be implemented using any suitable data storage technology, such as semiconductor based memory devices, flash memory, magnetic memory devices and systems, optical memory devices and systems, fixed memory and removable memory. The DPs 610A, 620A and 630A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. A method, comprising:
   establishing, over a first communication connection, a first security connection between a first network node and a user equipment;
   obtaining, from a second network node, a first information, the first information comprising at least one of system information of the second network node and an identifier of a security algorithm selected by the second network node for the user equipment;
   providing, by the first network node and to the second network node, a second information, the providing being in response to an indication received from the user equipment that the user equipment has detected the second network node, and the second information comprising security information related to the user equipment;
   sending, to the first user equipment, the first information comprising at least one of the system information of the second network node and the identifier of the security algorithm selected by the second network node for the user equipment, the first information enabling the user equipment to establish a second connection to the second network node.

2. The method according to claim 1, wherein the first network node comprises a first radio access network node serving the user equipment, and wherein the second node comprises a second radio access network node.

3. The method according to claim 1, wherein the first information is obtained through a direct interface comprising an X2 interface.

4. The method according to claim 1, wherein the first security connection is still maintained when the second security connection is established to enable dual connectivity at the user equipment.

5. The method according to claim 1, wherein the establishing the first security connection comprises obtaining a first security key for the first security connection, and wherein the second information comprises at least one of a second system information related to the second network node and security information comprising another identifier of the user equipment and a second security key generated based at least in part on the first security key.

6. The method according to claim 1, wherein the first information is obtained through an indirect interface between the first network node and the second network node.

7. The method according to claim 1, wherein the second node comprises a second radio access network node configured to provide a local area network serving the user equipment.

8. An apparatus, comprising:
   at least one processor; and
   at least one memory including computer program code, the at least one memory and the computer program code configured to, with the at least one processor, cause the apparatus to at least:
      establish, over a first communication connection, a first security connection between the apparatus and a user equipment;
      obtain, from another apparatus, a first information, the first information comprising at least one of system information of the another apparatus and an identifier of a security algorithm selected by the another apparatus for the user equipment;
      provide, to the another apparatus, a second information, the second information provided in response to an indication received from the user equipment that the user equipment has detected the another apparatus, and the second information comprising security information related to the user equipment;
      send, to the user equipment, the first information comprising at least one of the system information of the second network node and the identifier of the security algorithm selected by the second network node for the user equipment, the first information enabling the user equipment to establish a second security connection to the second network node.

9. The apparatus according to claim 8, wherein the first network node comprises a first radio access network node serving the user equipment, and wherein the second node comprises a second radio access network node.

10. The apparatus according to claim 8, wherein the first information is obtained through a direct interface comprising an X2 interface.

11. The apparatus according to claim 8, wherein the first security connection is still maintained when the second security connection is established to enable dual connectivity at the user equipment.

* * * * *